United States Patent [19]
Gluszek et al.

[11] Patent Number: 5,449,275
[45] Date of Patent: Sep. 12, 1995

[54] CONTROLLER AND METHOD FOR OPERATION OF ELECTRIC FAN

[76] Inventors: Andrzej Gluszek; Jolanta M. Gluszek, both of 7 Gulf Line Rd., Liverpool, N.Y. 13090

[21] Appl. No.: 328,055

[22] Filed: Oct. 24, 1994

Related U.S. Application Data

[63] Continuation-in-part of Ser. No. 60,413, May 11, 1993, abandoned.

[51] Int. Cl.$^6$ .............................................. F04B 49/00
[52] U.S. Cl. .................................... 417/14; 417/18; 417/22; 417/32; 417/53; 417/63; 236/91 C; 236/49.3
[58] Field of Search .................. 417/14, 18, 22, 32, 417/53, 63; 236/49.3, 91 C; 62/176.6

[56] References Cited

U.S. PATENT DOCUMENTS

| | | | |
|---|---|---|---|
| 3,726,473 | 4/1973 | Sapir | 236/49.3 X |
| 4,734,012 | 3/1988 | Dob et al. | 417/32 |
| 4,873,649 | 10/1989 | Grald et al. | 62/176.6 X |
| 5,145,112 | 9/1992 | Ueda | 62/186 |
| 5,172,856 | 12/1992 | Tanaka et al. | 236/49.3 |
| 5,187,943 | 2/1993 | Taniguchi et al. | 236/49.3 X |
| 5,261,596 | 11/1993 | Tachibana et al. | 236/49.3 |

*Primary Examiner*—Richard A. Bertsch
*Assistant Examiner*—Xuan M. Thai

[57] ABSTRACT

A fan speed controller and a method which allows to maintain a constant level of thermal sensation felt by a human body when air temperature, relative humidity, thermal radiation and distance between the fan and the human body are changing. Desired thermal comfort index can be preset and fan speed is varied in response to air temperature, relative humidity, thermal radiation and distance between the fan and the human body to provide a constant level of thermal sensation.

12 Claims, 10 Drawing Sheets

CONTROLLER AND METHOD FOR OPERATION OF ELECTRIC FAN

This application is a continuation-in-part of U.S. application, Ser. No. 08/060,413, filed May 11, 1993, now abandoned.

FIELD OF THE INVENTION

The present invention relates to a fan powered by an electric motor where the speed of the blades is varied in response to air temperature, relative humidity, thermal radiation and distance between the fan and the human body.

BACKGROUND AND SUMMARY OF THE INVENTION

It is well known that the same temperature will produce a different sensation of heat or cold at different levels of relative humidity, air speed and thermal radiation. Most people will feel comfortable at 80 degrees Fahrenheit and 20% relative humidity in calm air at given thermal radiation, but at the same temperature, air speed, and thermal radiation nearly everyone will feel uncomfortable with humidity increased to 90%. The single thermal comfort index, called effective temperature is being used to represent reaction of most people to a combined effect of air temperature, humidity, thermal radiation and air speed. With increased air movement the discomfort associated with air temperature, humidity or thermal radiation can be greatly reduced.

Many types of temperature responsive fan speed control circuits are currently known. However, they do not allow the setting of a known effective temperature and they do not provide a constant level of effective temperature sensed by the human body when air temperature, relative humidity, thermal radiation and distance between the fan and the human body are changing. U.S. Pat. No. 4,734,012 discloses a fan speed control circuit where triac conduction angle is varying in response to air temperature. But the issue of setting the known effective temperature and providing a constant level of effective temperature when even only air temperature is changing, is not addressed. To provide a constant level of thermal sensation when air temperature is changing, even at constant level of relative humidity, thermal radiation and distance between the fan and the human body, the fan speed has to be varied in a specific non-linear way to achieve required air velocity. FIG. 3 shows the required air speed to maintain an effective temperature, at a constant level of 74 degrees Fahrenheit when air temperature is changing and the humidity and external thermal radiation are constant. Graphs showing influence of air temperature, relative humidity, air speed and mean radiant temperature on thermal comfort can be found in ASHRE HANBOOK OF FUNDAMENTALS, published by the American Society of Heating and Air-Conditioning Engineers.

Besides effective temperature, many other thermal comfort indexes are currently being used to represent the combined effect of air temperature, humidity, thermal radiation and air speed on human thermal comfort. Some of them, like sensible temperature, apparent temperature or wet-bulb globe temperature (WGBT) are expressed in degrees Fahrenheit. New thermal comfort index can be created by testing the reaction of people to the combined effect of air temperature, relative humidity, air speed and mean radiant temperature on thermal comfort. From the test data a lookup table can be created and used with a microprocessor. This new thermal comfort index does not necessarily have to be expressd in degrees Fahrenheit. Similar to a description commonly used on comfort charts, just three levels of thermal comfort can be used: cool, comfortable and warm. This approach will greatly reduce the amount of required memory for the microprocessor lookup table.

Though the present invention is being described by using effective temperature as a preferred thermal comfort index, it is not dependent on any specific thermal comfort index representing the relation between air temperature, relative humidity, air speed and a mean radiant temperature. As a result, the description of this invention, presented below is also valid when the effective temperature is replaced with a thermal comfort index and an adjusted effective temperature (ETa) is replaced by an adjusted thermal comfort index (TCIa).

The human body maintains normal internal temperature at about 98 degrees Fahrenheit by the physiological process of thermoregulation in response to external factors of air temperature, humidity, thermal radiation and air velocity. For the body to maintain normal temperature, the sum of the following: heat gain from body metabolism, heat loss by sweat evaporation, heat gain or loss by convection, heat gain or loss by conduction and heat gain or loss by radiation must equal zero. If the sum is positive, internal temperature will start rising and thermal injury to the body is possible. The human body looses heat mainly by the process of convection, evaporation and radiation. At air temperature above 90 degrees Fahrenheit the human body stays cool mainly by the process of sweat evaporation from the skin. At 80 degrees Fahrenheit heat loss due to convection and radiation is about equal to the heat loss due to evaporation. The process of heat transfer by evaporation, convection and conduction is influenced by air movement. By varying air speed in a specific way it is possible to create a comfortable environment over a wide range of air temperature, humidity and thermal radiation. In the application of the present invention where the human body may gain heat from external thermal radiation, e.g. from the sun, sensing the level of this radiation is important so that required air speed could be delivered. In most air conditioning systems the air velocity is below 20 feet per minute in order to avoid drafts of cold air. But when circulating air has temperature equal to the room air temperature, much higher air velocity is acceptable. Even in an office environment where high air speed is not acceptable, the effective temperature can be reduced by about 4 degrees Fahrenheit without disturbing papers. For workers performing physical labor much higher air speed is acceptable and higher reduction of effective temperature is possible.

Effective temperature is a complex function of air temperature, relative humidity, air velocity and thermal radiation. Required effective temperature can be achieved by many different combinations of the above variables. By changing only the air speed, the effective temperature can be maintained over a wide range of other variables. However, there is an upper limit for the air velocity to provide cooling. For example, at high air temperature and low humidity the human body may not be able to sweat fast enough to match the rate of evaporation and too high rate of air movement may actually reduce the rate of human body heat loss. Also, above certain air temperature, which depends on humidity and thermal radiation, the heating effect of the moving air is greater than the cooling effect.

When the required effective temperature cannot be achieved by varying the air speed, three warning indicators are provided to show the reason. Low cost versions of the fan controller for the present invention are possible with the use of a microprocessor.

The present invention can be used for table fans, ceiling fans, fans in cars or buses and the like. This invention will allow the keeping of higher temperature in air coditioned spaces and at the same time will allow indivdual persons to control effective temperature to meet their paticular requirements.

The main object of the present invention is to allow the setting of, and maintenance of a desired level of effective temperature produced by a fan when air temperature, humidity, thermal radiation and distance between the fan and the human body are changing.

It is another object of this invention to provide warning indication when the fan is running at maximum speed and is unable to produce set effective temperature because even higher fan speed is required to deliver required air velocity.

It is a further object of this invention to provide warning indication when the combined effect of air temperature, humidity, thermal radiation and air speed has reached a point at which any further increase of air speed will not result in additional effective air temperature reduction.

It is a further object of this invention to provide warning indication when the fan is unable to maintain the set effective temperature because existing effective air temperature is below the set effective temperature.

These and other objects of the present invention will be best understood from reading the following description of specific embodiments in connection with the accompanying drawings.

DESCRIPTION OF THE PREFERRED EMBODIMENTS

Figure 1:
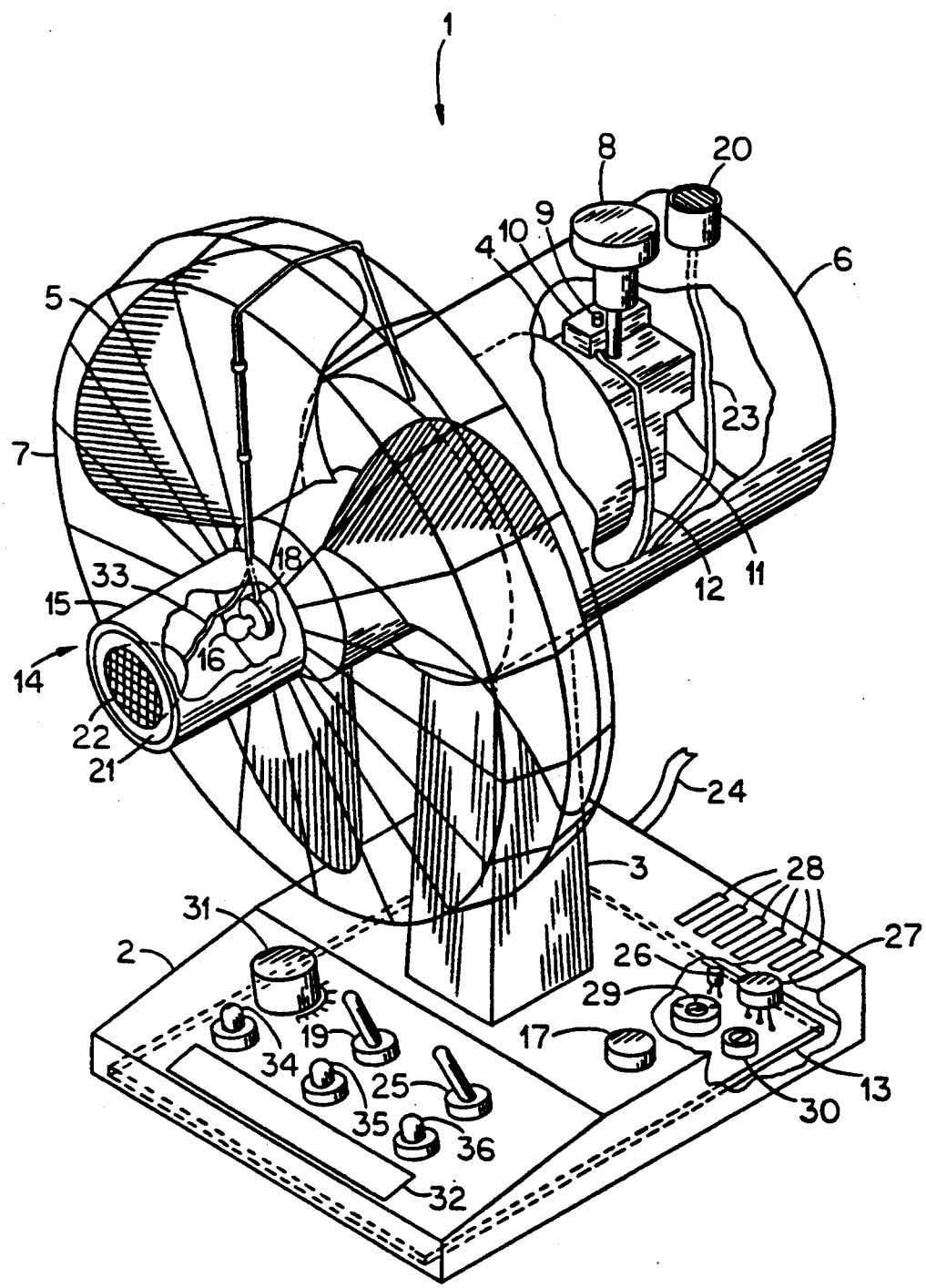
FIG. 1 is a perspective view of a fan equipped with the first embodiment of the present invention.

FIG. 1 shows a fan designated by reference character 1. The fan comprises a base 2 with attached to it column 3 which in turn supports a motor housing 6. Fan blades 5 are attached to the motor shaft (not shown) and they are protected by a wire screen 7, which is attached to the motor housing 6. A fan motor 4 with attached to it gear housing 11 is located inside the motor housing 6. The gear housing 11 contains a set of gears for reducing the speed of the motor to the speed required for the oscillating operation of the fan. The motor housing 6 is pivotally mounted to the column 3 to allow for the oscillating mode of operation of the fan. Oscillating operation of the fan is activated by pushing down a button 8, which in turn pushes down an actuator 9 of a limit switch 10 which serves as a sensor to detect the mode of operation of the fan. The mode of operation includes oscillating mode of operation and nonoscillating mode of operation. The limit switch 10 is electrically connected through cable 12 to a fan controller which is built on a printed circuit board 13. The printed circuit board 13 is mounted inside the base 2.

During the oscillating mode of operation, the human body is cooled by short lasting air blows, unlike with the continuous air movement produced during the nonoscillating mode of operation. When the fan operates according to the oscillating mode, the limit switch 10 signals the fan controller to operate the fan motor at a higher speed in order to produce a cooling effect equivalent to the one produced by the nonoscillating mode of operation.

Figure 4:
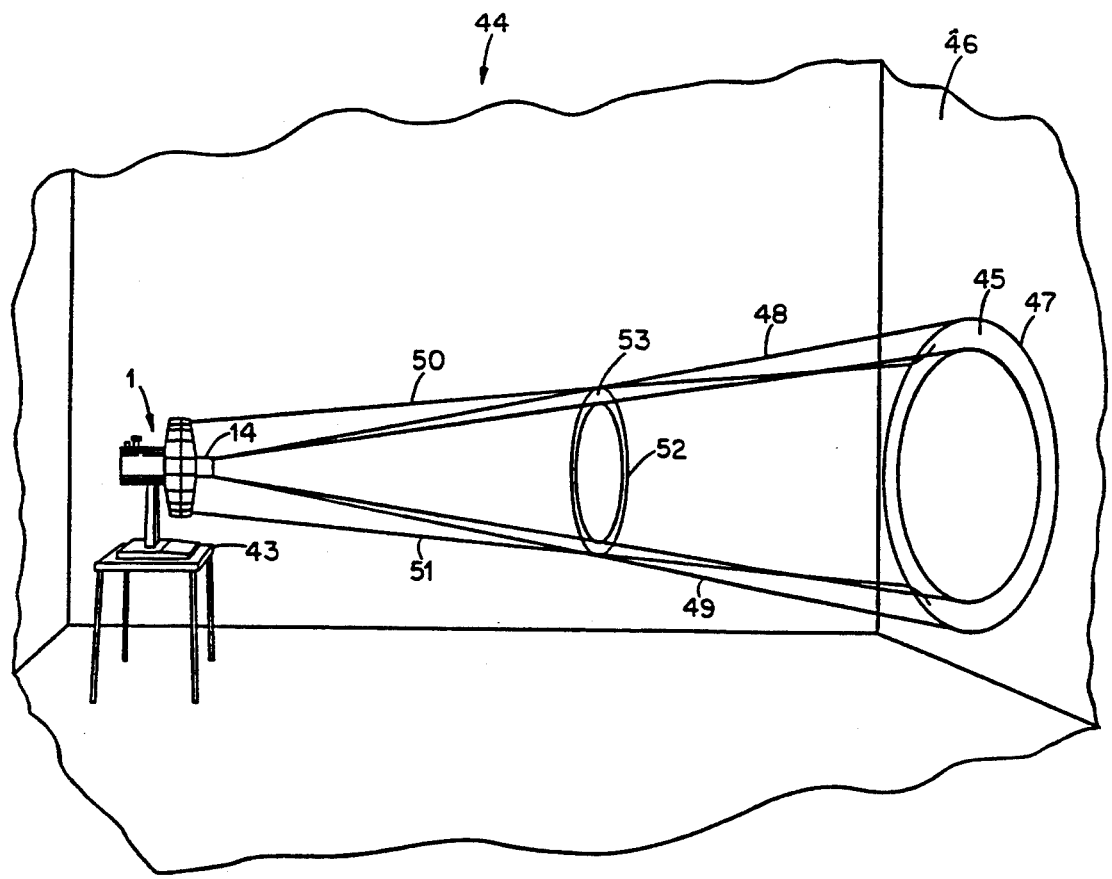
FIG. 4 is a perspective view of a fan equipped with a cooling area indicator, located inside a room.

In order to produce a known effective air temperature by a fan, proper positioning of the fan in reference to the human body is very important. For this purpose a cooling area indicator 14, which is attached to the wire screen 7, is being used. The cooling area indicator shows the area within which the air speed has a predefined value at a predefined distance from the fan. Light source 16 is mounted inside a cylindrically shaped cooling area indicator enclosure 15, in the center .of a rear circular wall. Voltage to the light source 16, which can be a high intensity light bulb, is supplied through cable 18 which is connected to the printed circuit board 13. The light source can be turned on and turned off by a switch 19. Front circular wall has a transparent ring 21, for allowing the light emitted from a light source 16 to pass throught it. The rest of the enclosure is opaque. When the fan is placed in front of the wall, with the motor shaft being perpendicular to the wall, as shown in FIG. 4, the image produced by the cooling area indicator 14 will be a bright ring. FIG. 4 will be described in details later.

Because the air speed is decreasing as distance from the fan is increasing, an ultrasonic distance sensor 22 is being used to find the distance between the human body and the fan. Ultrasonic distance sensor 22 is located at the center of the front wall of the cooling area indicator enclosure and is electrically connected through a cable 33 to the printed circuit board 13.

Electric power is supplied to the fan through a cable 24, which is connected to a power switch 25. The power switch is a lever type and is provided for applying electric power to the fan. A maximum operational length of the cooling space is set by a knob 17. When distance between the human body and the fan is greater than the distance set by the knob 17, the fan motor will de-energize. An air temperature sensor 26, which can be a thermistor type, and a relative humidity sensor 27, are mounted on the printed circuit board 13. Openings 28 are provided for the circulation of air around the air temperature sensor 26 and around the relative humidity sensor 27. A fan size selector 29, shown as a three position rotary switch, allows the same fan controller to be used on three different fan sizes. A cutoff speed adjustment 30, shown as a potentiometer, allows the setting of a minimum speed of the motor, below which the motor will be de-energized.

The fan size selector 29 and the cutoff speed adjustment 30 are especially useful in the simplified version of this embodiment (e.g. without distance sensor, maximum distance adjustment and mode of operation sensor) when built in a separate enclosure to be connected through a power cord with the existing fans.

Desired effective temperature can be set by a knob 31, which has a dial around it, calibrated in degrees Fahrenheit. Set effective temperature is also displayed on a display 32 which is a liquid crystal type. Thermal radiation sensor 20 is electrically connected through a cable 23 to the printed circuit board 13. In outdoor applications most of the thermal radiation will come from the sun.

When the fan cannot produce the effective air temperature equal to the effective air temperature set with knob 31, one of the warning indicators, described below will be activated.

A maximum speed warning indicator 34, shown as a light emitting diode, is provided for indicating a condition when the set effective air temperature cannot be obtained because the fan motor is running at maximum speed and even higher speed is required to produce effective air temperature set by the knob 31. When the maximum speed warning indicator 34 is glowing, the effective air temperature is above the set effective air temperature. The problem can be corrected by moving the fan closer to the human body.

Danger zone warning indicator 35, is provided for indicating a condition when the set effective air temperature cannot be obtained because the combined effect of air temperature, relative humidity, thermal radiation and air speed has reached a point at which any further increase of air speed will not result in additional effective temperature reduction. When the danger zone warning indicator 35 is glowing, the effective air temperature is above the set effective air temperature and further increase in air speed could actually resullt in effective air temperature increase in some cases.

At air temperature above 98.6 Fahrenheit the human body may gain heat from the air. When body perspiration rate is not high enough to match the rate of evaporation, the internal body temperature may start increasing and this may lead to a heat stroke. Too high air speed, especially at low air humidity will make the condition even more dangerous because the rate of evaporation and body heat gain from the air will be even faster. When the danger zone warning indicator 35 is glowing, the fan speed may actually start decreasing as air temperature is increasing.

Low temperature warning indicator 36 is provided to indicate a condition when effective air temperature is below effective temperature set by knob 31. The display 32 is provided for displaying air temperature, relative humidity, thermal radiation, distance between the human body and the fan, set effective temperature (with knob 31), mode of operation, set cutoff speed of the motor, selected fan size, maximum operational length of the cooling space set by knob 17, fan speed, effective air temperature produced by the fan at the location of the human body, air speed at location of the human body and maximum air temperature at which the set effective air temperature can be produced at location of the human body (at current values of the following parameters: humidity, thermal radiation, distance between the human body and the fan, mode of operation and fan size).

Many less expensive versions of this embodiment are possible. For example, the ultrasonic distance sensor can be replaced by a potentiometer equipped with a calibrated dial which will allow the setting of estimated (or measured) existing distance between the human body and the fan. Similarly, any of the other sensors can be replaced by a potentiometer having a calibrated dial which will allow the setting of an estimated value of the parameter represented by the replaced sensor. Even less expensive versions of this embodiment are possible, by removing any of the sensors or adjustments and assigning default values to the parameters represented by the removed sensors and adjustments. On fans not equipped with the distance sensor, the front wall of the cooling area indicator enclosure will have an opaque circle in place of the distance sensor.

Figure 2:
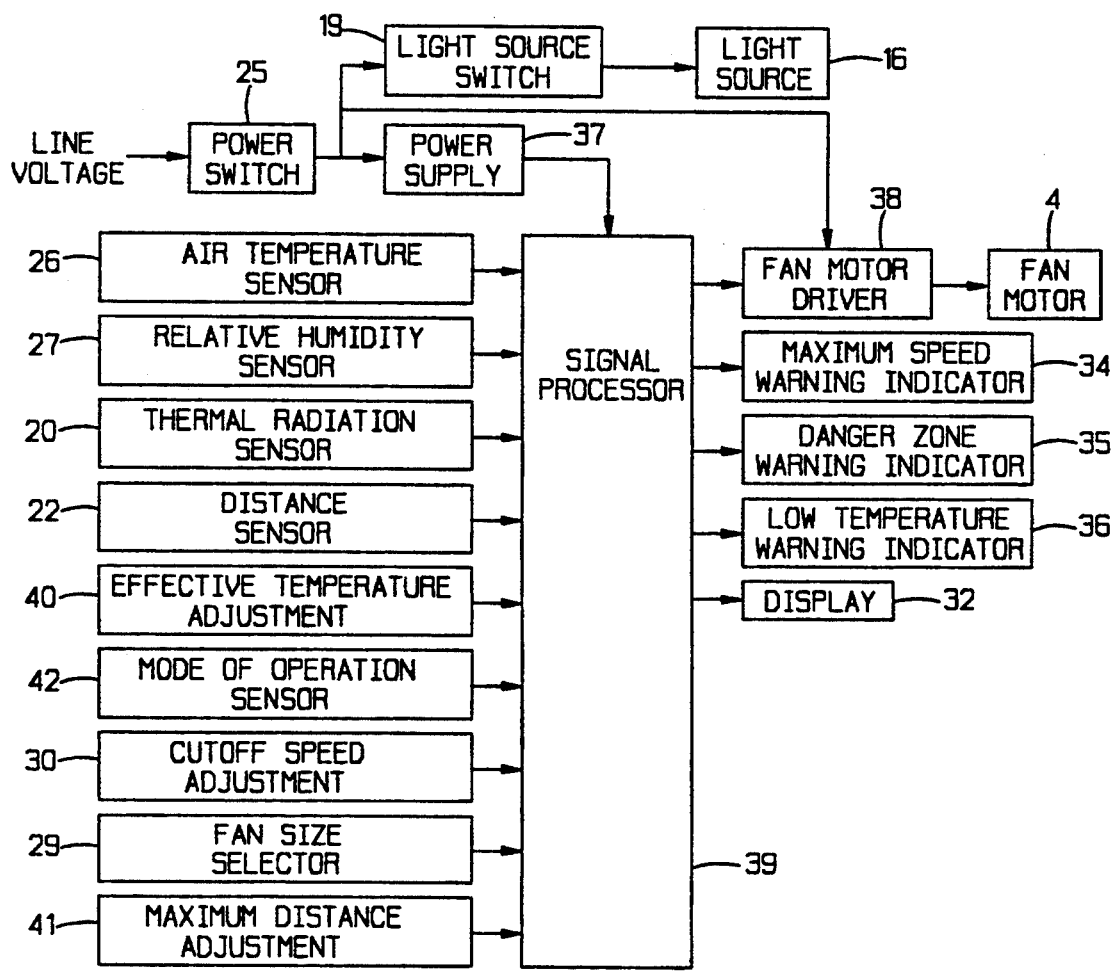
FIG. 2 is a block diagram of the circuit of the first embodiment of the present invention.

FIG. 2 shows a block diagram of the circuit of the fan shown in FIG. 1. Line voltage is supplied through the power switch 25 to a power supply 37, to a fan motor driver 38 and, through the light source switch 19, to the light source 16. The power supply 37 converts line voltage to a voltage required by a signal processor 39. The signal processor can be a single chip microprocessor with on-board multichannel analog to digital converter, liquid crystal display drivers and digital inputs and outputs. Inputs from multi-channel analog to digital converter are connected to the air temperature sensor 26, relative humidity sensor 27, thermal radiation sensor 20, distance sensor 22, effective temperature adjustment 40 (which can be a potentiometer equipped with a knob 31 shown in FIG. 1), cutoff speed adjustment 30 and the maximum distance adjustment 41 (which can be a potentiometer equipped with a knob 17 shown in FIG. 1). Distance sensor 22 is shown as a device providing analog signal representing a distance between the fan and the human body. Mode of operation sensor 42 (which is shown in FIG. 1 as a limit switch 10) and the fan size selector 29 are connected to digital (logic level sensing) inputs of the signal processor 39.

The signal processor reads signals from the air temperature sensor 26, relative humidity sensor 27, thermal radiation sensor 20, distance sensor 22, effective temperature adjustment 40, mode of operation sensor 42, cutoff speed adjustment 30, fan size selector 29, and maximum distance adjustment 41.

Required air speed (Vra) for achieving adjusted effective air temperature can be found based on the values of signals received from: an air temperature sensor, relative humidity sensor, thermal radiation sensor and effective temperature adjustment. The required air speed (Vra) is a function of: dry bulb air temperature (Ta), relative air humidity (H), thermal radiation (TR) and adjusted effective temperature (ETa).

The required air speed (Vra) can be expressed as:

$$Vra = f1(Ta, H, TR, ETa)$$

Required fan speed (Vfr) for achieving required air speed (Vra) can be found based on the required air speed (Vra) and based on the values of signals received from: distance sensor, mode of operation sensor and fan size selector. The required fan speed (Vfr) is a function of: required air speed (Vra), distance between the human body and the fan (D), selected oscillating or nonoscillating mode of operation (M) and selected (with the fan size selector 29) fan size parameter (FS) which represents the size of the fan blades and the size of the fan motor being used. The required fan speed can be expressed as:

$$Vfr = f2(Vra, D, M, FS)$$

or after substituting f1(Ta,H,TR,ETa) for Vra the required fan speed (Vfr) for achieving adjusted air temperature (by producing required air speed) can be expressed as:

$$Vfr = f3(Ta, H, TR, ETa, D, M, FS)$$

The required fan speed (Vfr) is a function of: dry bulb air temperature (Ta), relative air humidity (H), thermal radiation (TR), adjusted effective temperature (ETa), distance between the human body and the fan (D), selected oscillating or nonoscillating mode of operation (M) and selected (with the fan size selector 29) fan size parameter (FS) which represents the size of the fan blades and the size of the fan motor being used.

For any combination of the parameters (Ta, H, TR, D, M and FS) there is only one value of the required fan speed (Vfr) which will produce the adjusted effective temperature (ETa), assuming that the adjusted effective temperature (ETa) can be achieved at the given value of these parameters. The microprocessor can find the required fan speed (Vfr) through calculations or from a lookup table stored in the microprocessor program memory.

During the oscillating mode of operation, when the human body is cooled by short lasting air blows, the fan produces required average air speed (Vavg) at location of the human body. This average air speed (Vavg) is equal to the constant air velocity (Vcon) that would produce the adjusted effective air temperature.

Because the effective air temperature is a nonlinear function of air speed, the average air speed (Vavg) will produce different effective air temperature than the constant air velocity (Vcon) would produce. The difference, among other factors, depends on the shape of the air speed waveform at location of the human body.

A more accurate method of effective temperature control is possible when a concept of effective air speed is used. The concept of the effective air speed, which is being introduced here, is similar to the concept of effective electrical current. In this more accurate method of effective temperature control, the fan produces required effective air speed (Vrea) at location of the human body.

Required effective air speed (Vrea), of air having periodically variable velocity is defined here as equal to the speed of air having a constant velocity that would produce the same cooling effect on the human body as the air having periodically variable velocity. This definition is equivalent to the definition of effective electrical current, or the root mean square current. The effective air speed can also be determined for non-periodically variable air speed during a given interval of time.

When a fan operates in the nonoscillating mode, the air speed is constant and the effective air speed produced by the fan is equal to the average air speed.

Required effective air speed (Vrea) for achieving adjusted effective air temperature is expressed as:

$$Vrea = f1(Ta, H, TR, ETa)$$

Required fan speed (Vfr1) for achieving required effective air speed (Vrea) can be expressed as:

$$Vfr1 = f4(Vrea, D, M, FS)$$

or after substituting f1(Ta,H,TR,ETa) for Vrea the required fan speed (Vfr1) for achieving adjusted air temperature (by producing required effective air speed) can be expressed as:

$$Vfr1 = f5(Ta, H, TR, ETa, D, M, FS)$$

The fan motor driver 38 can be a triac which can control an induction type motor. Maximum speed warning indicator 34, danger zone warning indicator 35 and low temperature warning indicator 36 are light emitting diodes and are driven directly by microprocessor outputs. The display 32 is a liquid crystal type and is driven directly by a microprocessor equipped with liquid crystal display drivers.

Figure 3:
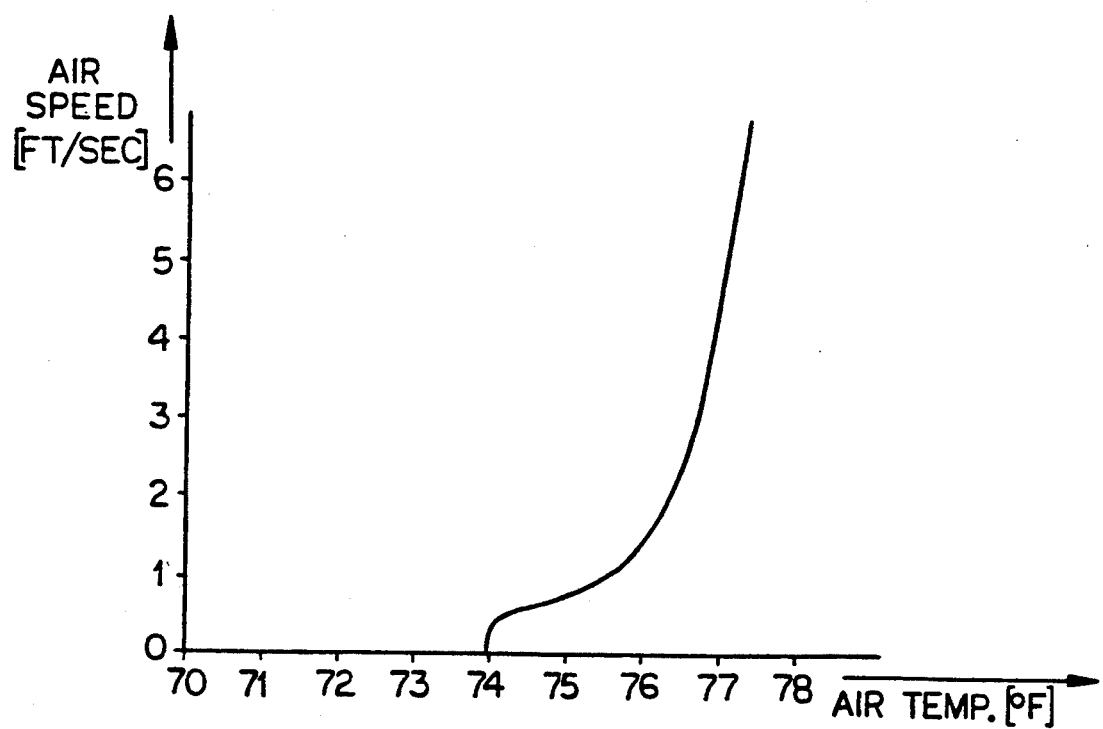
FIG. 3 is a graph showing the relationship between air temperature and the required air speed in order to maintain a constant level of the effective temperature, at constant humidity and constant external thermal radiation.

FIG. 3 shows the required air speed to maintain effective air temperature at a constant level of 74 degrees Fahrenheit when air temperature is changing and humidity and external thermal radiation are constant.

FIG. 4 shows the fan 1 placed on a table 43, located inside a room 44. The light emitted by the cooling area indicator 14, produces an image of a bright ring 45 on the wall 46. Indicative cooling space, created by the cooling area indicator 14, has the shape of a cone which is located between the lines 48 and 49 and has its base created by the outer circle 47 of the bright ring 45.

Real cooling space created by the fan has the shape of a cone which is located between lines 50 and 51. Close to the wall 46 the lines 50 and 51 are bent because of the air flow pattern.

Indicative cooling space indicates the real cooling space with a sufficient accuracy. A circle 52 is at the location where real cooling area is equal to the indicative cooling area. A ring 53 would be the image of the bright ring if a wall was placed at location of the ring 53.

Figure 5:
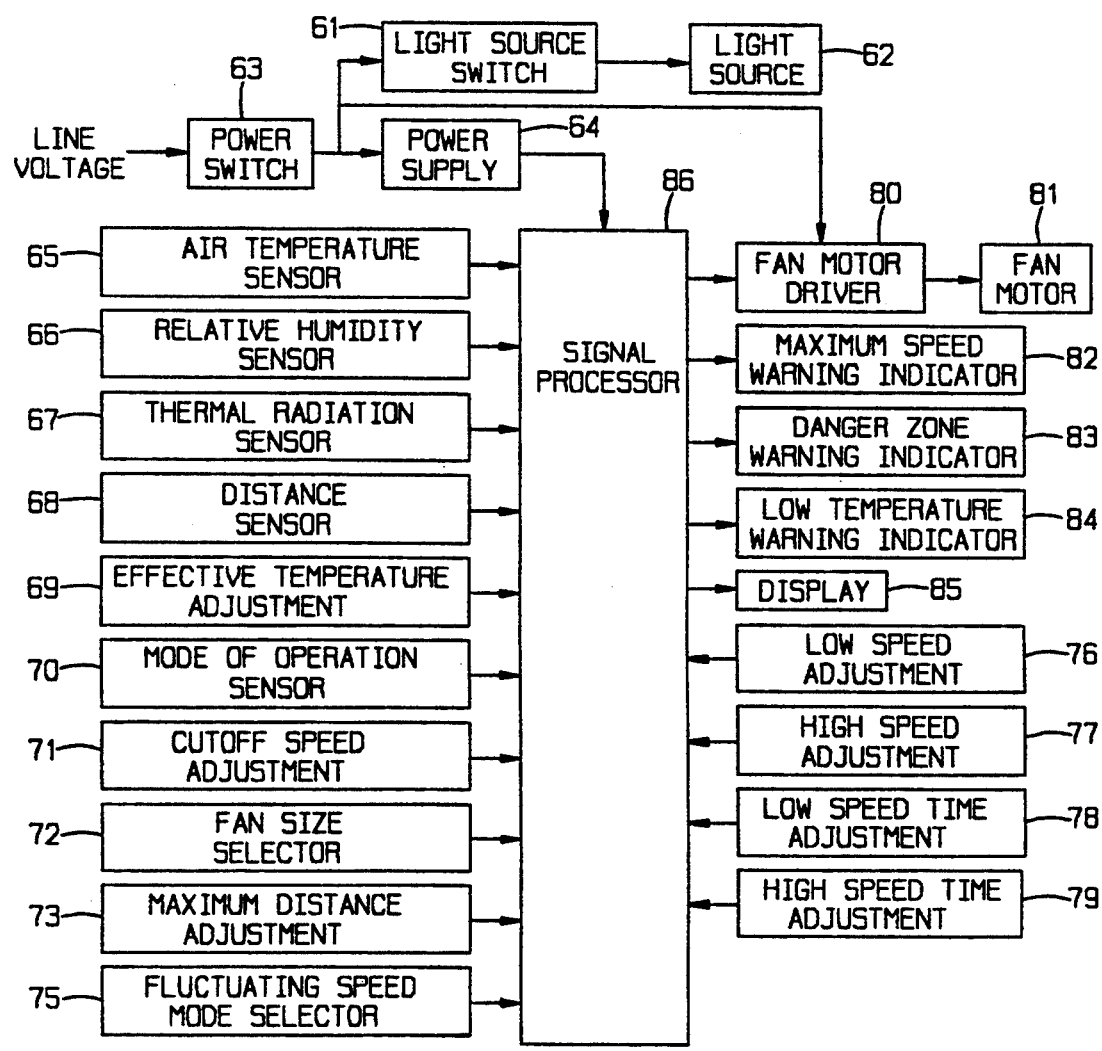
FIG. 5 is a block diagram of the circuit of the second embodiment of the present invention.

FIG. 5 shows a block diagram of the circuit of the second embodiment of the present invention. In this embodiment a fluctuating speed operating mode has been added, which is characterized by recurrent changes in the fan speed. Some people prefer periodic changes in the speed of the cooling air, such as delivered by an oscillating fan. The adjustable effective temperature can be maintained by a nonoscillating fan producing fluctuating air speed. For example, the fan operating in the fluctuating speed operating mode can deliver a variable air speed by periodically energizing and deenergizing the fan motor, or by periodically changing the fan speed between a predetermined low speed and a predetermined high speed. The air speed versus time, in this case, will be represented by a square waveform. The effective air temperature can be maintained by varying the value of any combination of the following square waveform parameters: high speed, low speed, high speed duration time and low speed duration time.

Any combination of three of the square waveform parameters can be user adjustable and the nonadjustable parameters can be varied to maintain the adjusted effective air temperature.

The fan operating in the fluctuating speed operating mode can deliver higher average air speed than the oscillating fan, and at the same time will use less electricity, by cooling only the area at location of the human body.

The FIG. 5 shows the block diagram of the fan with adjustments for the square waveform parameters. A fluctuating speed mode selector 75, is a switch for activating and deactivating the fluctuating speed operating mode. A low speed adjustment 76 is a potentiometer for setting the low speed value. High speed adjustment 77 is a potentiometer for setting the high speed value. A low speed time adjustment 78 is a potentiometer for setting the low speed duration time. High speed time adjustment 79 is a potentiometer for setting the high speed duration time.

When the difference between the high speed and the average speed of the air speed waveform is small, the adjusted effective temperature can be maintained with good accuracy by delivering air velocity having average air speed equal to the required constant air velocity. This required constant air velocity is equal to the speed of air that would produce adjusted effective temperature. When the difference between the high speed and the average speed of the air speed waveform is significant, for example when the air is delivered during short lasting blows, the adjusted air temperature can be maintained with greater accuracy by delivering required effective air speed.

The adjusted effective temperature can be maintained by air speed representing many different waveform shapes, but the changes in air velocity must include the changes below and above the required constant air speed that would maintain the adjusted effective temperature.

The fluctuating speed operation, during which the fan motor is being periodically energized and deenergized, can be used to avoid excessive noise produced by some electric motors when controlled by a triac during low speed operation.

The other advantage of the fluctuating speed operating mode is the ability to produce the average air speed which is below the minimum available from the fan operating near the cutoff speed. This is especially useful during operation of electric motors with high cutoff speed.

When the fluctuating speed operating mode is deactivated, the operation description of the second embodiment is the same as for the first embodiment. Line voltage is supplied through the power switch 63 to a power supply 64, to a fan motor driver 80 and, through the light source switch 61, to the light source 62 of a cooling area indicator. The power supply 64 converts line voltage to a voltage required by a signal processor 86. The signal processor can be a single chip microprocessor with on-board multi-channel analog to digital converter, liquid crystal display drivers and digital inputs and outputs. Inputs from multichannel analog to digital converter are connected to the air temperature sensor 65, relative humidity sensor 66, thermal radiation sensor 67, distance sensor 68, effective temperature adjustment 69 cutoff speed adjustment 71 and the maximum distance adjustment 73. Distance sensor 68 is shown as a device providing analog signal representing a distance between the fan and the human body. Mode of operation sensor 70 and the fan size selector 72 are connected to digital (logic level sensing) inputs of the signal processor 86.

The signal processor reads signals from the air temperature sensor 65, relative humidity sensor 66, thermal radiation sensor 67, distance sensor 68, effective temperature adjustment 69, mode of operation sensor 70, cutoff speed adjustment 71, fan size selector 72, and maximum distance adjustment 73.

The fan motor driver 80 can be a triac which controls fan motor 81. Maximum speed warning indicator 82, danger zone warning indicator 83 and low temperature warning indicator 84 are light emitting diodes and are driven directly by microprocessor outputs. The display 85 is provided for displaying air temperature, relative humidity, thermal radiation, distance between the human body and the fan, set effective temperature, mode of operation, set cutoff speed of the motor, selected fan size, maximum operational length of the cooling space, fan speed, effective air temperature produced by the fan at the location of the human body, effective air speed at location of the human body, and maximum air temperature at which the set effective air temperature can be produced at location of the human body (at current values of the following parameters: humidity, thermal radiation, distance between the human body and the fan, mode of operation and fan size).

Required air speed (Vra) for achieving adjusted effective air temperature can be found based on the values of signals received from: air temperature sensor, relative humidity sensor, thermal radiation sensor and effective temperature adjustment. The required air speed (Vra) is a function of: dry bulb air temperature (Ta), relative air humidity (H), thermal radiation (TR) and adjusted effective temperature (ETa).

Figure 6:
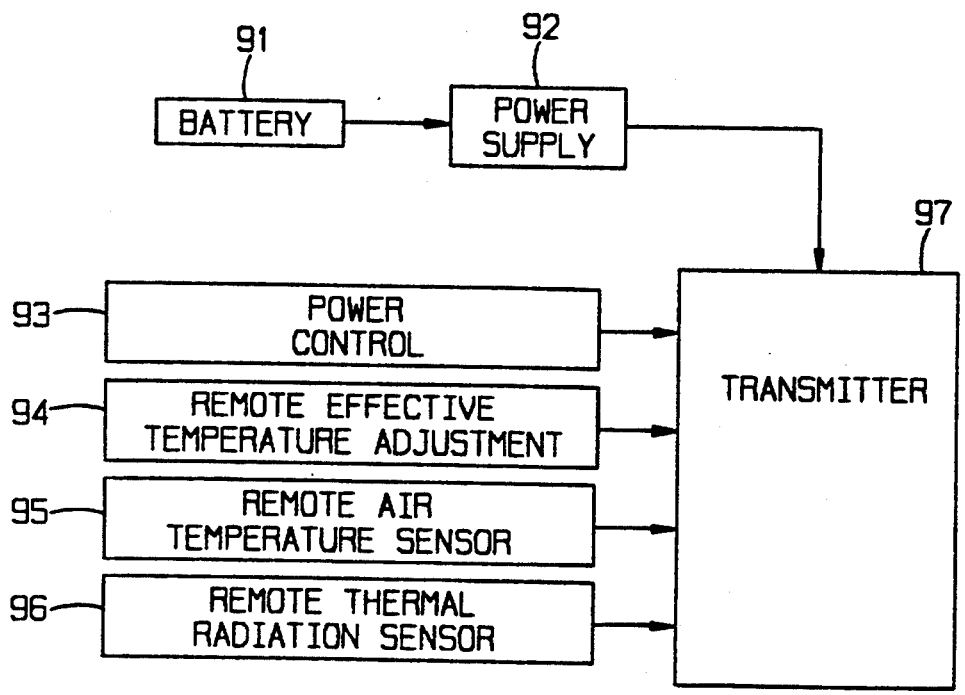
FIG. 6 is a block diagram of the circuit of a remote transmitting unit used in a third embodiment of the present invention.
Figure 7:
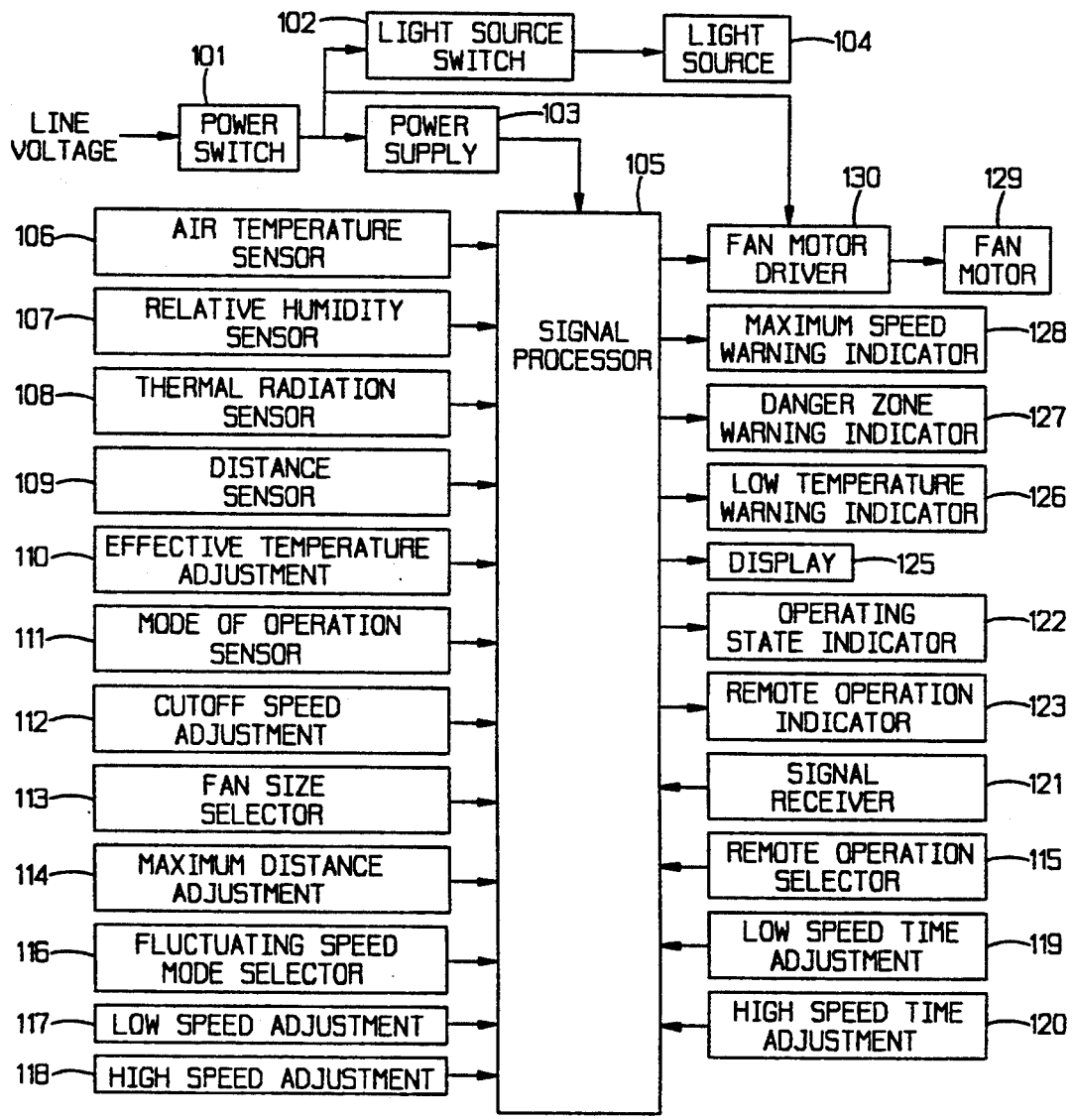
FIG. 7 is a block diagram of the circuit of a receiving unit used in a third embodiment of the present invention.

FIG. 6 and FIG. 7 show block diagrams of a third embodiment of the present invention. In this embodiment, the operation of the fan can be controlled by using a hand-held remote transmitter.

The remote transmitter controls the operation of the fan by sending infrared signals to a receiving unit which is mounted on the fan. Different versions of this embodiment can use ultrasonic, radio frequency, or electrical signals instead of infrared signals. When electrical signals are used, the remote transmitter is connected to the receiving unit through an electrical cable.

FIG. 6 shows a block diagram of the remote transmitter. Power control 93 is a push button for the remote control of the fan motor by enabling and disabling its operation. Remote effective temperature adjustment 94 can be a potentiometer equipped with a knob and a dial calibrated in degrees Fahrenheit. Transmitter 97 sends signals representing: the desired enabled or disabled state of the fan motor, the adjusted effective air temperature from the remote effective temperature adjustment 94, air temperature from the remote air temperature sensor 95 and the thermal radiation from the remote thermal radiation sensor 96. Power supply 92 converts voltage supplied by a battery 91 to a voltage required by the transmitter 97.

The remote transmitter can have a calculator type keyboard instead of the potentiometer for selecting the desired effective temperature.

FIG. 7 shows a block diagram of a circuit of the receiving unit, which is mounted inside the base of the fan. There are two separate temperature adjustments, air temperature sensors and thermal radiation sensors in this embodiment. The remote effective temperature adjustment 94, the remote air temperature sensor 95 and the remote thermal radiation sensor 96 are mounted on the remote transmitter. The effective temperature adjustment 110, the air temperature sensor 106 and the thermal radiation sensor 108 are mounted on the fan.

The remote air temperature sensor 95 and the remote thermal radiation sensor 96 provide more accurate measurments then the air temperature sensor 106 and the thermal radiation sensor 108, because the remote transmitter can be located in close proximity to the human body. For example, there may be a big difference between temperature measurment from remote air temperature sensor 95 and the measurement from the air temperature sensor 106, when the fan is located in an open window and is blowing cool air from the outside.

When the remote operation is selected with a remote operation selector 115, the signal processor 105 uses data received through a signal receiver 121. Signal receiver 121 receives data from the remote effective temperature adjustment 94, remote air temperature sensor 95 and from remote thermal radiation sensor 96, but ignores data from the effective temperature adjustment 110, air temperature sensor 106 and from the thermal radiation sensor 108. The remote operation selector 115 can be a push button switch for activating and deactivating the remote operation. A remote operation indicator 123, which can be a light emitting diode, is provided to indicate when the remote operation is selected.

An operating state indicator 122 is provided to indicate when the controller is operating to maintain the adjusted effective temperature. The indication of operation is necessary, because during the operation the fan motor may be deenergized when the effective air temperature is equal to, or is below the adjusted effective temperature.

The third embodiment of the present invention also includes the fluctuating speed operating mode. FIG. 7 shows the block diagram of the fan with adjustments for the square waveform parameters. A fluctuating speed mode selector 118, is a switch for activating and deactivating the fluctuating speed operating mode. A low speed adjustment 117 is a potentiometer for setting the low speed value. High speed adjustment 118 is a potentiometer for setting the high speed value. A low speed time adjustment 119 is a potentiometer for setting the low speed duration time. High speed time adjustment 120 is a potentiometer for setting the high speed duration time.

When the remote operation and the fluctuating speed operating mode are deactivated, the operation description of the third embodiment is the same as for the first embodiment. Line voltage is supplied through the power switch 101 to a power supply 103, to a fan motor driver 130 and, through the light source switch 102, to the light source 104 of a cooling area indicator. The power supply 103 converts line voltage to a voltage required by a signal processor 105. The signal processor can be a single chip microprocessor with an on-board multichannel analog to digital converter, liquid crystal display drivers and digital inputs and outputs. Inputs from multichannel analog to digital converter are connected to the air temperature sensor 106, relative humidity sensor 107, thermal radiation sensor 108, distance sensor 109, effective temperature adjustment 110, cutoff speed adjustment 112 and the maximum distance adjustment 114. Distance sensor 109 is shown as a device providing analog signal representing a distance between the fan and the human body. Mode of operation sensor 111 and the fan size selector 113 are connected to digital (logic level sensing) inputs of the signal processor 105.

The signal processor reads signals from the air temperature sensor 106, relative humidity sensor 107, thermal radiation sensor 108, distance sensor 109, effective temperature adjustment 110, mode of operation sensor 111, cutoff speed adjustment 112, fan size selector 113, and maximum distance adjustment 114.

The fan motor driver 130 can be a triac which controls fan motor 129. Maximum speed warning indicator 128, danger zone warning indicator 127, and low temperature warning indicator 126 are light emitting diodes and are driven directly by microprocessor outputs. The display 125 is provided for displaying air temperature, relative humidity, thermal radiation, distance between the human body and the fan, set effective temperature, mode of operation, set cutoff speed of the motor, selected fan size, maximum operational length of the cooling space, fan speed, effective air temperature produced by the fan at the location of the human body, effective air speed at the location of the human body, and maximum air temperature at which the set effective air temperature can be produced at the location of the human body (at current values of the following parameters: humidity, thermal radiation, distance between the human body and the fan, mode of operation and fan size).

Required air speed (Vra) for achieving adjusted effective air temperature can be found based on the values of signals received from: an air temperature sensor, relative humidity sensor, thermal radiation sensor and effective temperature adjustment. The required air speed (Vra) is a function of: dry bulb air temperature (Ta), relative air humidity (H), thermal radiation (TR) and adjusted effective temperature (ETa).

In the three embodiments of the present invention, as described above, it is assumed that the required fan speed (Vfr) will produce the required air speed (Vra) at location of the human body. In some cases, the actual air speed at location of the human body may be different from the required air speed (Vra) expected to be produced by the required fan speed (Vfr). (For example due to drafts from open windows). By measuring the air speed at location of the human body, a more accurate maintanace of the adjusted effective temperature (ETa) can be achieved.

Figure 8:
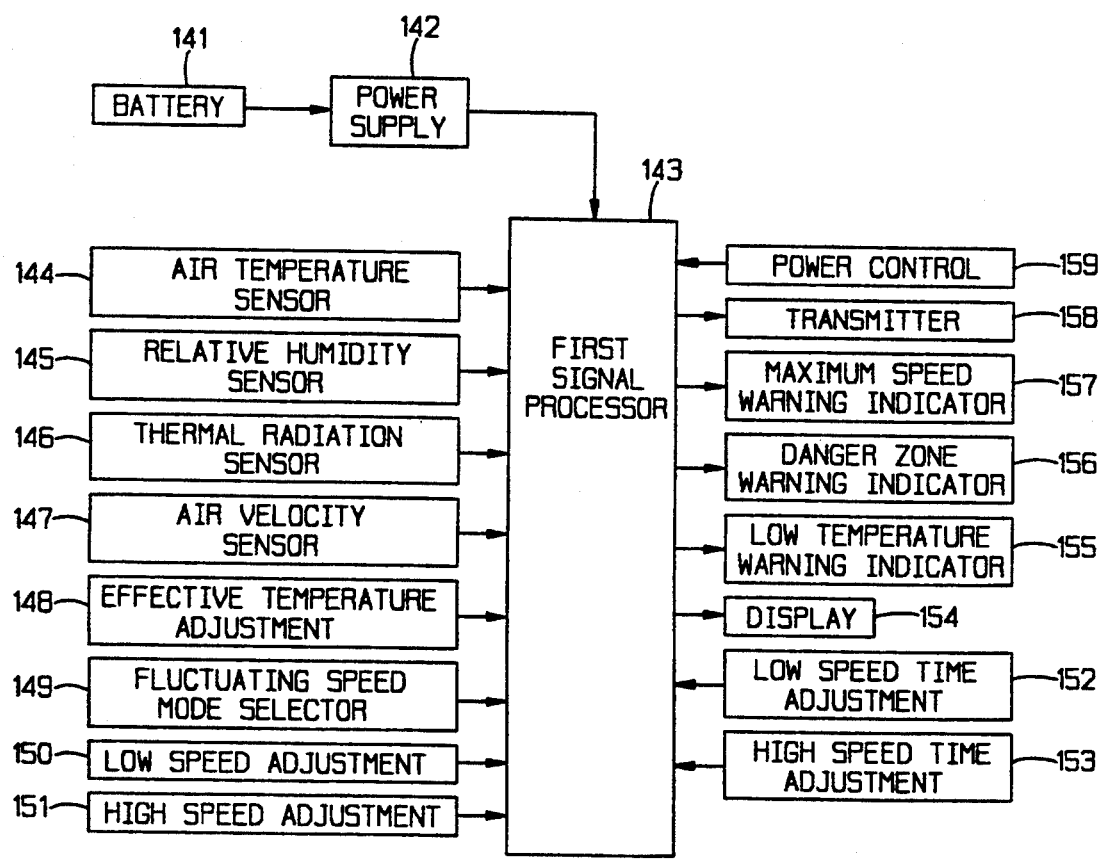
FIG. 8 is a block diagram of the circuit of a remote sensing unit used in a fourth embodiment of the present invention.
Figure 9:
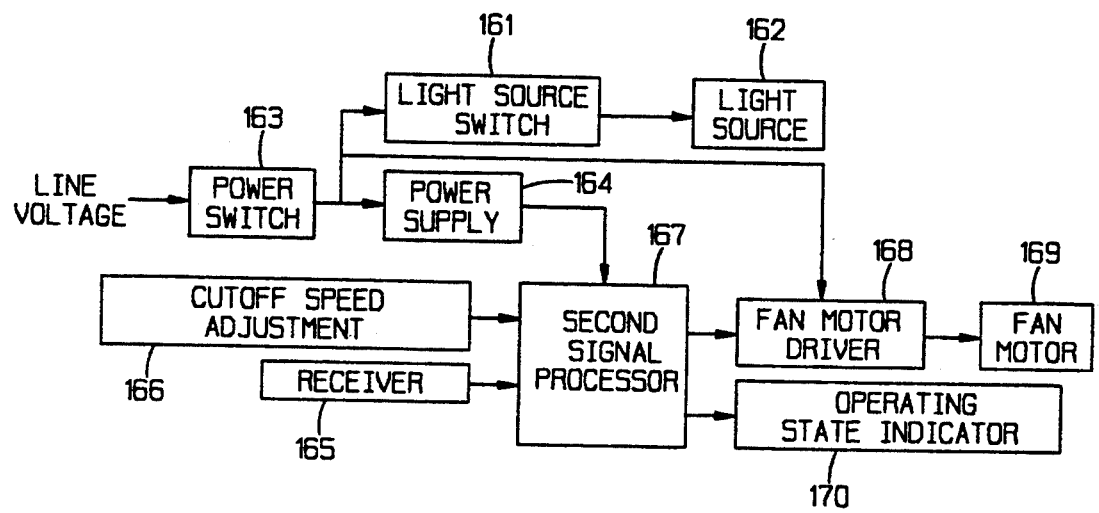
FIG. 9 is a block diagram of the circuit of a receiving unit used in a fourth embodiment of the present invention.

FIG. 8 and FIG. 9 show a block diagram of a fourth embodiment of the present invention. In this embodiment, air temperature, relative humidity, thermal radiation and air velocity are measured by the remote sensing unit which is located in the proximity of the human body. Distance sensor, mode of operation sensor, and fan size selector are not needed in this embodiment of the present invention because the air speed is measured at the location of the human body. The required air speed (Vra) is expressed in the same way as in the first embodiment:

$$Vra = f1(Ta, H, TR, ETa)$$

The remote sensing unit controls fan speed by sending infrared signals to a receiving unit which is mounted on the fan. Different versions of this embodiment can use ultrasonic, radio frequency, or electrical signals instead of infrared signals. When electrical signals are used, the remote sensing unit is connected to the receiving unit through an electrical cable.

FIG. 8 shows a block diagram of a circuit of the remote sensing unit. A first signal processor 143, is a single chip microprocessor which has on-board multichannel anolog to digital converter and liquid crystal display drivers. The first signal processor 143 finds the required air velocity for achieving adjusted effective temperature through calculations or from a look-up table stored in the microprocessor program memory, based on the value of the signals received from air temperature sensor 144, relative humidity sensor 145, thermal radiation sensor 146 and effective temperature adjustment 148. The effective temperature adjustment 148 is a potentiometer equipped with a knob and a dial calibrated in degrees Fahrenheit.

When the air speed, sensed by an air velocity sensor 147, is different from the required air speed, the first signal processor 143 directs the second signal processor 167 (shown in FIG. 9) to increase or decrease the speed of a fan motor 169 by sending signals through a transmitter 158.

Maximum speed warning indicator 157, danger zone warning indicator 156, and low temperature-warning indicator 155 operate in the same way as the warning indicators, respectively, 34, 35, and 36 which are described in the first embodiment of the present invention. A display 154 which is a liquid crystal type, is provided for displaying air temperature, relative humidity, thermal radiation, air velocity, adjusted effective temperature and effective air temperature at location of the remote sensing unit. Power supply 142 converts voltage supplied by a battery 141 to a voltage required by the first signal processor 143. Power control 159 is a push button for the remote ON-OFF control of the fan motor 169.

The fourth embodiment of the present invention also includes the fluctuating speed operating mode. FIG. 8 shows a block diagram of a circuit of the remote sensing unit with adjustments for the square waveform parameters. A fluctuating speed mode selector 149, is a switch for activating and deactivating the fluctuating speed operating mode. A low speed adjustment 150 is a potentiometer for setting the low speed value. High speed adjustment 151 is a potentiometer for setting the high speed value. A low speed time adjustment 152 is a potentiometer for setting the low speed duration time. High speed time adjustment 153 is a potentiometer for setting the high speed duration time.

The remote sensing unit can have a calculator type keyboard instead of the potentiometers for selecting desired effective temperature, low speed, high speed, low speed time and high speed time.

FIG. 9 shows a block diagram of a circuit of the receiving unit. Line voltage is supplied through the power switch 163 to a power supply 164, to a fan motor driver 168 and, through the light source switch 161, to the light source 162 of a cooling area indicator. The power supply 164 converts line voltage to a voltage required by the second signal processor 167. The second signal processor 167 receives signals, through a receiver 165, from the remote sensing unit when the change in the speed of the fan motor 169 is required. A cutoff speed adjustment 166 allows the setting of a minimum speed of the motor, below which the motor will be deenergized.

An operating state indicator 170 is provided to indicate when the controller is operating to maintain the adjusted effective temperature. The indication of operation is necessary, because during the operation the fan motor may be deenergized when the effective air temperature is equal to, or is below the adjusted effective temperature.

As in the previous embodiments, for more accurate method of the effective temperature control, the concept of the effective air speed can be used. The required effective air speed (Vrea) is expressed in the same way as in the first embodiment:

$$Vrea = f1(Ta, H, TR, ETa)$$

Figure 10:
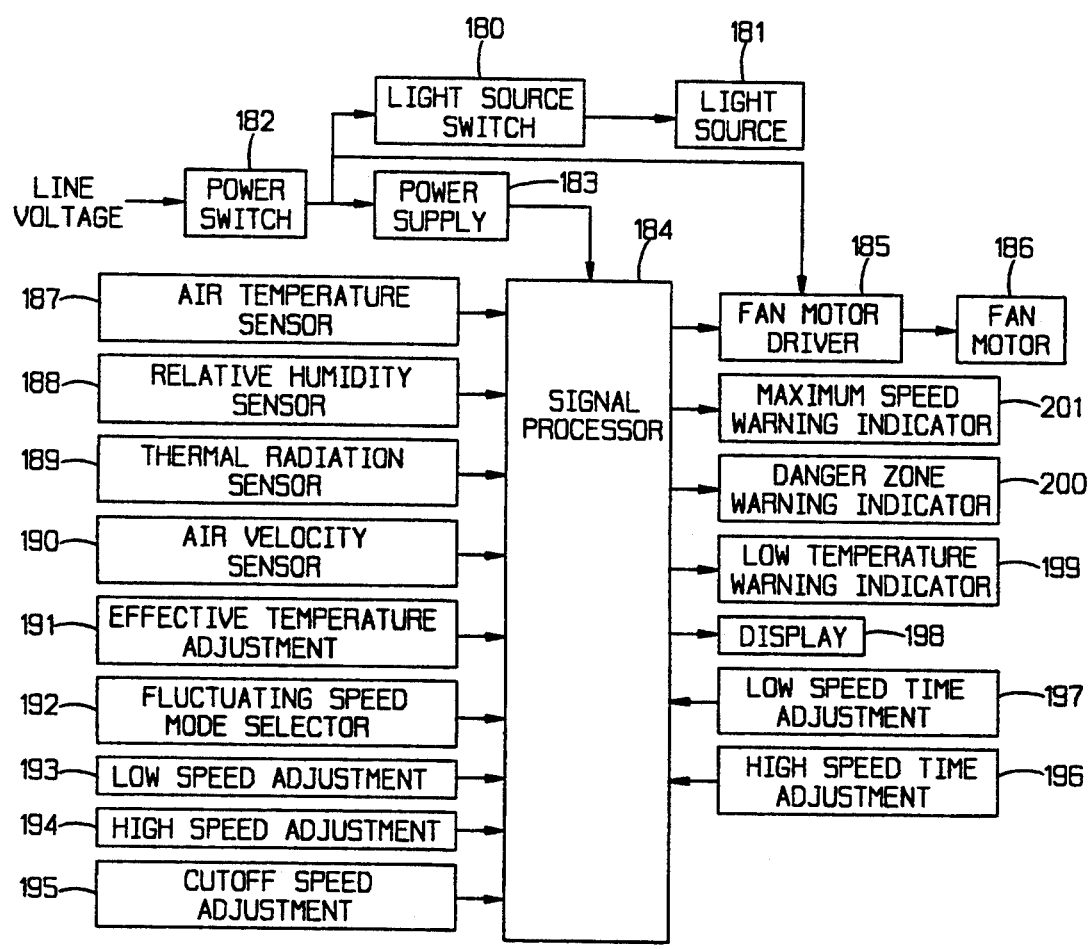
FIG. 10 is a block diagram of the circuit of the fifth embodiment of the present invention.

FIG. 10 shows a block diagram of a fifth embodiment of the present invention. In this embodiment the remote sensing unit (FIG. 8) and the receiving unit (FIG. 9) from the fourth embodiment of the present invention, are combined into a single fan controller unit which will be located close to the human body. The fan will be connected to the fan controller unit only with the fan's electrical power cord.

The principle of operation of the fan controller unit is similar to the operation of the fan controller from the fourth embodiment. The air temperature, relative humidity, thermal radiation and air velocity are measured by the fan controller unit which is located in the proximity of the human body. The required air speed (Vra) is expressed in the same way as in the first embodiment:

$$Vra = f1(Ta, H, TR, ETa)$$

FIG. 10 shows a block diagram of a circuit of the fan controller unit. A signal processor 184, is a single chip microprocessor which has on-board multichannel anolog to digital converter and liquid crystal display drivers. The signal processor 184 finds the required air velocity for achieving adjusted effective temperature through calculations, or from a look-up table stored in the microprocessor program memory, based on the value of the signals received from air temperature sensor 187, relative humidity sensor 188, thermal radiation sensor 189 and effective temperature adjustment 191. When the air speed, sensed by an air velocity sensor 190, is different from the required air speed, the signal processor 184 directs the fan motor driver 185 to increase or to decrease the speed of a fan motor 186.

The effective temperature adjustment 191 is a potentiometer equipped with a knob and a dial calibrated in degrees Fahrenheit. Maximum speed warning indicator 201, danger zone warning indicator 200, and low temperature warning indicator 199 operate in the same way as the warning indicators, respectively, 34, 35, and 36 which are described in the first embodiment of the present invention. A display 198 which is a liquid crystal type, is provided for displaying adjusted effective temperature, air temperature, relative humidity, thermal radiation, air velocity, and effective air temperature at location of the fan controller unit.

The fifth embodiment of the present invention also includes the fluctuating speed operating mode. FIG. 10 shows a block diagram of the fan controller unit with adjustments for the square waveform parameters. A fluctuating speed mode selector 192, is a switch for activating and deactivating the fluctuating speed operating mode. A low speed adjustment 193 is a potentiometer for setting the low speed value. High speed adjustment 194 is a potentiometer for setting the high speed value. A low speed time adjustment 197 is a potentiometer for setting the low speed duration time. High speed time adjustment 196 is a potentiometer for setting the high speed duration time. Line voltage is supplied through the power switch 182 to a power supply 183, to a fan motor driver 185 and, through the light source switch 180, to the light source 181 of a cooling area indicator. The power supply 183 converts line voltage to a voltage required by the signal processor 184. A cutoff speed adjustment 195 allows the setting of a minimum speed of the motor, below which the motor will be de-energized.

As in the previous embodiments, for more accurate method of the effective temperature control, the concept of the effective air speed can be used. The required effective air speed (Vrea) is expressed in the same way as in the first embodiment:

$$Vrea = f1(Ta, H, TR, ETa)$$

Many less expensive versions of all five embodiments of the present invention are possible. Any of the sensors can be replaced by a potentiometer having a calibrated dial which will allow the setting of an estimated value of the parameter represented by the replaced sensor. Even less expensive versions are possible, by removing any of the sensors or adjustments and assigning default values to the parameters represented by the removed sensors and adjustments. For example, a fan responding only to air temperature can operate according to the disclosed method, when the default values are assigned to all other parameters. In this case, when the required effective temperature is set at 74 degrees Fahrenheit the fan speed has to be varied according to the graph shown in FIG. 3

Though the present invention has been described by using the effective temperature as a preferred thermal comfort index, it is not dependent on any specific thermal comfort index representing the relation between air temperature, relative humidity, air speed and a mean radiant temperature. The above presented description of this invention is also valid when the effective temperature is replaced with a thermal comfort index and an adjusted effective temperature (ETa) is replaced by an adjusted thermal comfort index (TCIa).

While this invention has been illustrated and described with reference to the specific embodiments, it is not intended to be limited to the details shown, since various modifications are possible without departing from the spirit of the present invention.

What is claimed is:

1. A method for maintaining a constant level of a thermal comfort index (TCI) at a level of an adjustable thermal comfort index (TCIa) by varying a fan speed (Vf) in response to:
   (a) dry bulb air temperature (Ta),
   (b) relative air humidity (H),
   (c) thermal radiation (TR),
   (d) distance (D) between a human body and a fan,
   (e) selectable oscillating and nonoscillating mode of operation (M) of said fan, and
   (f) selectable fan size parameter (FS) for selecting a size of fan blades and a size of a fan motor being used;

said fan speed (Vf) being maintained at a level of a required fan speed (Vfr);
said required fan speed (Vfr) being expressed as:

$$Vfr = f(Ta, H, TR, TCIa, D, M, FS);$$

said required fan speed (Vfr) is defined as required fan speed to achieve an adjusted thermal comfort index (TCIa) at given: Ta, H, TR, D, M and FS; and said thermal comfort index (TCI) being a function of: dry bulb air temperature, relative air humidity, thermal radiation and air speed.

2. The method of claim 1 with any combination of variables H, TR, TCIa, D, M, and FS having assigned constants as default values.

3. The method of claim 1 further including a fluctuating speed operating mode; said fluctuating speed operating mode is characterized by recurrent speed changes of said fan; and said fan operating according to said fluctuating speed operating mode is delivering a fluctuating air velocity which will produce said thermal comfort index (TCI) at location of said human body equal to said adjusted thermal comfort index (TCIa).

4. The method of claim 3 in which said recurrent speed changes of said fan are characterized by a repetitive change between a low speed and a high speed; said low speed being produced for a period of a low speed time; said high speed being produced for a period of a high speed time; said ajusted thermal comfort index (TCIa) being maintained at location of said human body by varying any combinaton of the following fluctuating speed parameters: said low speed, said high speed, said high speed time; and unvarying said fluctuating speed parameters having assigned default values.

5. The method of claim 3 in which said required fan speed (Vfr) is producing air velocity having required effective air speed (Vrea); said required effective air speed (Vrea) is defined as:
   required effective air speed to achieve said ajusted thermal
comfort index (TCIa) at given: Ta, H, TR, D, M, FS; where effective air speed of air having variable velocity is defined to be equal to the speed of air having constant velocity that would produce the same cooling effect on the human body as the air having variable velocity.

6. The method of claim 3 further including:
   (a) indication of condition at which said fan cannot produce said adjusted thermal comfort index (TCIa), because the necessary fan speed is greater then a maximum achievable speed of said fan;
   (b) indication of condition, at which said fan cannot produce said adjusted thermal comfort index (TCIa), because a combined effect of said dry bulb air temperature (Ta), said relative air humidity (H), said thermal radiation (TR), and air speed has reached a point at which an increase of air speed will not result in reduction of the difference between said adjusted thermal comfort index (TCIa) and said thermal comfort index (TCI) at location of said human body; and
   (c) indication of condition, at which said fan cannot produce said adjusted thermal comfort index (TCIa), because said fan speed (Vf) is equal zero and an increase of air speed will result in increase of the difference between said adjusted thermal comfort index (TCIa) and said thermal comfort index (TCI) at location of said human body.

7. A method for maintaining a constant level of a thermal comfort index (TCI) at a level of an adjustable thermal comfort index (TCIa) by varying a fan speed (Vf) in response to:
   (a) dry bulb air temperature (Ta),
   (b) relative air humidity (H), (c) thermal radiation (TR), and
(d) air speed (Va); said fan speed (Vf) producing said air speed (Va) at location of a human body; said air speed (Va) being maintained at a level of a required air speed (Vra) by increasing said fan speed (Vf) when said air speed (Va) is below said required air speed (Vra), decreasing said fan speed (Vf) when said air speed (Va) is above said required air speed (Vra) and keeping said fan speed (Vf) constant when said air speed (Va) is equal to said required air speed (Vra); said required air speed (Vra) being expressed as a following function:

$$Vra = f(Ta, H, TR, TCIa);$$

said required air speed (Vra) having a predefined air velocity, said predefined air velocity being equal to a required air speed that would achieve said adjusted thermal comfort index (TCIa) at given: Ta, H, TR; and said thermal comfort index (TCI) being a function of: dry bulb air temperature, relative air humidity, thermal radiation and air speed.

8. The method of claim 7 with any combination of variables H, TR and TCIa having assigned constants as default values.

9. The method of claim 7 further including a fluctuating speed operating mode; said fluctuating speed operating mode is characterized by recurrent speed changes of said fan; and said fan operating according to said fluctuating speed operating mode is delivering a fluctuating air velocity which will produce said thermal comfort index (TCI) at location of said human body equal to said adjusted thermal comfort index (TCIa).

10. The method of claim 9 in which said recurrent speed changes of said fan are characterized by a repetitive change between a low speed and a high speed; said low speed being produced for a period of a low speed time; said high speed being produced for a period of a high speed time; said ajusted thermal comfort index (TCIa) being maintained at location of said human body by varying any combinaton of the following fluctuating speed parameters: said low speed, said high speed, said low speed time said high speed time; and unvarying said fluctuating speed parameters having assigned default values.

11. The method of claim 9 in which said required air speed (Vra) is having a predefined effective air velocity; said predefined effective air velocity being equal to a required effective air speed that would achieve said adjusted thermal comfort index (TCIa) at given: Ta, H, TR; and an effective air speed of air having variable velocity is defined as equal to the speed of air having constant velocity that would produce the same cooling effect on the human body as the air having variable velocity.

12. The method of claim 9 further including:
(a) indication of condition at which said fan cannot produce said adjusted thermal comfort index (TCIa), because the necessary fan speed is greater then a maximum achievable speed of said fan;
(b) indication of condition, at which said fan cannot produce said adjusted thermal comfort index (TCIa), because a combined effect of said dry bulb air temperature (Ta), said relative air humidity (H), said thermal radiation (TR), and air speed has reached a point at which an increase of air speed will not result in reduction of the difference between said adjusted thermal comfort index (TCIa) and said thermal comfort index (TCI) at location of said human body; and
(c) indication of condition, at which said fan cannot produce said adjusted thermal comfort index (TCIa), because said fan speed (Vf) is equal zero and an increase of air speed will result in increase of the difference between said adjusted thermal comfort index (TCIa) and said thermal comfort index (TCI) at location of said human body.

* * * * *